United States Patent [19]

Blow

[11] 4,225,966
[45] Sep. 30, 1980

[54] POWER AREA COLLOCATION OF TRANSMITTERS

[75] Inventor: Thomas C. Blow, Takoma Park, Md.

[73] Assignee: The United States of America as represented by the Secretary of the Army, Washington, D.C.

[21] Appl. No.: 78,617

[22] Filed: Oct. 6, 1970

[51] Int. Cl.³ ............................................. G01R 25/00
[52] U.S. Cl. .................................... 455/67; 324/83 R
[58] Field of Search ................ 343/18 E; 325/31, 363; 455/67

[56] References Cited

U.S. PATENT DOCUMENTS 4,146,892  3/1979  Overman et al. .................. 343/18 E Primary Examiner—T. H. Tubbesing
Attorney, Agent, or Firm—John R. Utermohle

[57] ABSTRACT

A method of collocating transmitters within a power area, utilizing the power supply ripple frequency components contained in the modulation envelope of radio transmissions. Two or more signals are first detected and then filtered to extract the ripple frequency components. The phase relation between the ripple components is then compared, a constancy of relation indicating that both signals have the same AC power source, and thus that the transmitters are located in the same power area.

8 Claims, 2 Drawing Figures

POWER AREA COLLOCATION OF TRANSMITTERS

BACKGROUND OF THE INVENTION

In many situations, it is desirable to have the ability to gain information about energy sources, particularly the location of transmitters. For example, it is sometimes as necessary to know the location of a transmitter as it is the information transmitted in order to correctly interpret the information. Many methods have been developed to gain information concerning power systems and transmitters. For instance, line-of-bearing techniques utilizing several receiver locations may be used for establishing transmitter locations. However, there are many instances where such direction finding equipment is not available. The present invention solves this problem in the prior art.

DESCRIPTION OF PRIOR ART

The prior art teaches the use of phase comparison of two known signals to determine location and range of a particular transmitter. This techinque has been employed in range determining systems and in navigational systems. Typical of this system is the method which compares a high frequency signal (the radiation field component of the signal being constant a few wave lengths removed from the antenna and hence used as a reference) with the angle of the resultant of the field created by a low frequency signal from the same source. After the difference angle has been determined, the distance to the transmitter can be computed by the appropriate mathematical formula. This method of course requires the cooperation of the transmitter. Another system finding use in the prior art measures the differences in time of arrival of two transmitted pulses. Typical of this method is the LORAN system used for long range aid to navigation. Again, however, no information concerning the location of such transmitters is taken from the transmitted signal itself.

SUMMARY OF THE INVENTION

An object of the present invention is to provide a new and improved method of collocating transmitters.

A further object of this invention is to provide a new and improved method of obtaining information about the size and power characteristics of power source areas.

With these and other objects in view, a method of collocating transmitters may include detection of two or more signals, and then comparing the phase of the ripple frequency components of the signals. Most radio transmitters, regardless of the type of transmissions, broadcast modulation components associated with the power supply frequency of the transmitter. These ripple components may be introduced into the carrier wave at the transmitter, or they may be present in the modulating signals. They are visible in graphic records of the amplitude envelope in most cases and can be readily extracted when of sufficient amplitude, by the use of a suitable filter. The ripple component is characterized by a fixed phase relationship with respect to the power source frequency, which persists for the duration of the transmission. This method is most beneficial when used in those areas of the world in which small power areas exist with no interconnections between those power areas.

DETAILED DESCRIPTION OF PREFERRED EMBODIMENT

Figure 1:
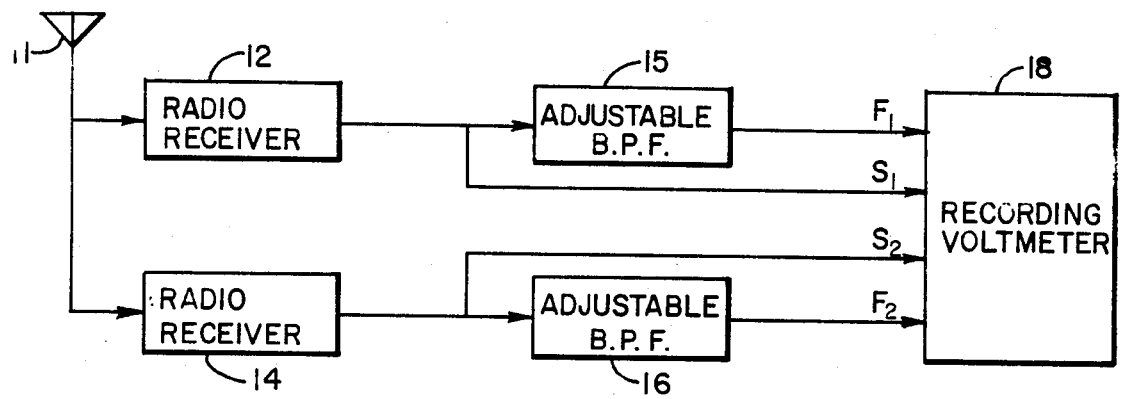
FIG. 1 is a block diagram of equipment that may be used to perform the utilized collocation method of the present invention.
Figure 2:
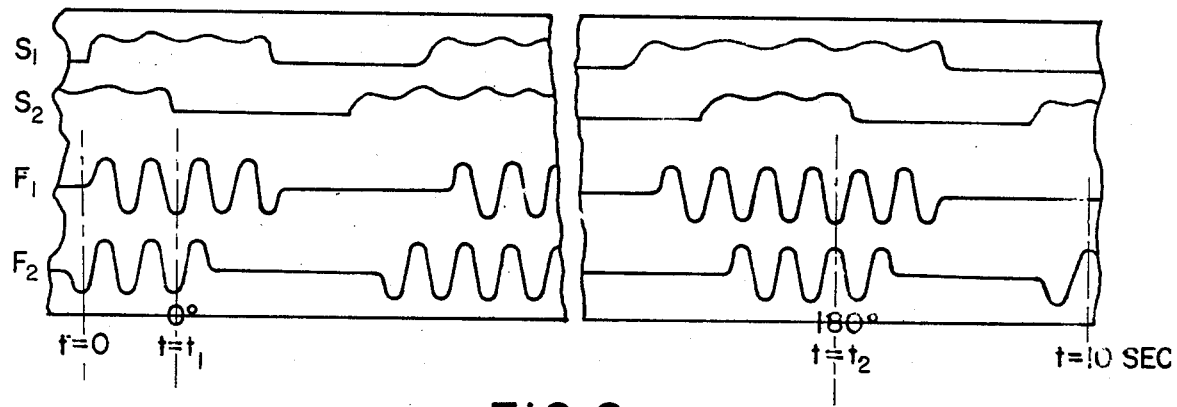
FIG. 2 is a typical display of a recording voltmeter.

Referring now to FIG. 1, an antenna 11 is connected to two receivers, a signal from a transmitter whose location is known being received by receiver 12 and an unknown signal by receiver 14. The receivers in turn are connected directly to adjustable bandpass filters 15 and 16. The outputs of the bandpass filters (ripple components) are then passed to the inputs of a recording voltmeter 18 which provides a visual record of the phase relationship between the two signals, a typical example of which is shown in FIG. 2.

The equipment used in the method is relatively simple, known in the art, and is commercially available. In operation, it is necessary that the transmitter power source be AC, and for most applications, a reference (known) transmitter is required. In addition, there must be a sufficient signal (ripple)-to-noise level such that after filtering, the individual ripple levels may be clearly seen and analyzed.

The transmitted signals are first detected by the antenna system. Although the principles of the present invention are applicable to many types of signals, including standard broadcast, radar, or Morse transmission, AM signals will be the subject of the preferred embodiment. Thus, the antenna 11, used to recover AM signal transmission, might be any one of a number of commercially available antennas capable of receiving radio-frequency signals. Connected to the antenna are two radio receivers 12 and 14. Again, in the typical example of AM transmission, the receivers might be well-known High Frequency radio receivers. One receiver would typically be tuned to receive a signal from the known transmitter, and the other to the unknown signal.

In the receivers 12 and 14, the signals undergo amplification and frequency conversion, and, in the case of AM transmission, the modulated signal is rectified, resulting in a signal which is a composite of the modulation envelope, certain frequencies associated with the modulating signals, and the ripple components associated with the transmission of the signals. These recovered signals are then passed to standard bandpass filters 15 and 16, which have been adjusted to pass only the ripple frequency component. Typically, the filter may be a standard L-C circuit, single tuned, with a bandwidth of between 20-25 Hz for AM transmissions. In the case of AM transmission, this bandwidth is sufficient to filter out both the modulation envelope and any frequency components associated with the modulating signal, leaving only the desired ripple components associated with the transmission of the signals, as explained above.

The recovered ripple components from each signal (known and unknown) are then applied to the inputs of a typical recording voltmeter 18 which traces the two ripple components for the visual inspection and comparison of the operator. The recording voltmeter must have sufficient frequency response to accurately trace voltage levels up to 500 Hz. In the case of AM transmission, the highest frequency one would normally encounter regarding ripple components would be 360 Hz for full wave-three phase power rectification. Thus, a 500 Hz capability would normally be sufficient to accurately trace the ripple components. A typical recording voltmeter suitable for use in this application is the Visicorder equipment manufactured by Honeywell, Inc.

The two traces on the Visicorder are then compared for constancy of the phase relationship between them. Such constancy indicates that the two signals originated in the same AC power source area. For example, referring to FIG. 2, a comparison of F1 and F2 over a period of time $t_2-t_1$ indicates that a shift in phase between the two filtered signals of a 180° has taken place. This indicates that these two signals were transmitted from sources in different power areas. However, if during time $t_2-t_1$ there was observed no phase shift between the two filtered signals, it could be reliably concluded that the two signals had sources in the same power area. Thus, if the area location of a single transmitter were known, the area location of the second transmitter would also then be known. A 10-second period of such phase comparison and observation is usually sufficient to observe any phase shift.

The above description is of a preferred embodiment of the invention, and numerous modifications could be made thereto without departing from the spirit and scope of the invention which is limited only as defined in the appended claims.

What is claimed is: Pg,6

1. A method of collocating transmitters comprising the steps of:
    detecting at least two transmitted signals, the signals having ripple frequency components; and
    comparing the ripple frequency components of the signals to collocate the transmitters.

2. The method of claim 1 wherein detecting includes selecting the ripple frequency components of the signals.

3. The method of claim 2 wherein detecting further includes bandpass filtering to select ripple frequency components.

4. The method of claim 3 wherein comparing includes separately tracing the ripple components.

5. The method of claim 4 wherein comparing further includes determining constancy of phase relation by collocating the separate traces.

6. The method of claim 5 wherein detecting includes detecting at least two modulated transmitted signals.

7. The method of claim 6 wherein detecting further includes detecting the amplitude envelopes of the modulated signals.

8. The method of claim 7 wherein filtering includes bandpass filtering the amplitude envelopes to select the ripple frequency components.

* * * * *